United States Patent [19]

Melvold et al.

[11] 4,329,132

[45] May 11, 1982

[54] HOLE PLUGGING SYSTEM

[75] Inventors: Robert W. Melvold, Simi Valley; John J. Vrolyk, Northridge; George H. Smith, Fillmore, all of Calif.

[73] Assignee: Rockwell International Corporation, El Segundo, Calif.

[21] Appl. No.: 194,206

[22] Filed: Oct. 6, 1980

[51] Int. Cl.³ .................. B63B 43/16; B32B 35/00
[52] U.S. Cl. .................. 425/13; 114/227; 220/239; 264/36; 264/45.2; 264/53; 425/12; 425/14
[58] Field of Search .............. 425/13, 14, 12; 264/36, 264/45.2, 53; 114/227, 228; 220/239

[56] References Cited

U.S. PATENT DOCUMENTS

| | | | |
|---|---|---|---|
| 2,220,085 | 11/1940 | Dirschel | 114/227 |
| 2,288,271 | 6/1942 | Dickey | 114/227 |
| 2,321,515 | 6/1943 | Rice | 114/227 |
| 2,446,190 | 8/1948 | Oding | 114/227 |
| 2,476,601 | 7/1949 | Harper | 114/227 |
| 2,754,910 | 7/1956 | Derrick et al. | |
| 3,088,172 | 5/1963 | Weinbrenner et al. | 264/45.2 X |
| 3,144,049 | 8/1964 | Ginsburgh | |
| 3,313,020 | 4/1967 | Krauskopf | 264/46.5 X |
| 3,472,285 | 10/1969 | Ginsburgh et al. | |
| 3,764,641 | 10/1973 | Ash | 264/45.2 |
| 3,772,113 | 11/1973 | Patrick | |
| 3,789,791 | 2/1974 | Lent et al. | 114/227 |
| 3,841,256 | 10/1974 | Etcaelecou et al. | 114/227 |
| 3,843,586 | 10/1974 | Wolf | |
| 3,866,560 | 2/1975 | Steward | 114/227 |
| 4,010,231 | 3/1977 | Phillips et al. | 264/36 X |
| 4,012,822 | 3/1977 | Vrolyk et al. | 264/36 X |
| 4,058,234 | 11/1977 | Vrolyk et al. | 264/36 X |
| 4,103,498 | 8/1978 | Steinborn et al. | 264/36 X |
| 4,269,890 | 5/1981 | Breitling et al. | 264/45.2 X |

FOREIGN PATENT DOCUMENTS

| | | | |
|---|---|---|---|
| 656199 | 1/1963 | Canada | 264/45.2 |
| 710259 | 5/1965 | Canada | 264/36 |
| 563977 | 9/1944 | United Kingdom | 114/227 |
| 870923 | 6/1961 | United Kingdom | 264/45.2 |
| 600027 | 3/1978 | U.S.S.R. | 114/227 |
| 679475 | 8/1979 | U.S.S.R. | 114/227 |

OTHER PUBLICATIONS

Sun, S. M., et al. "Feasibility of use of Plastic Foams for small Vessel Flotation Devices." Report AD-A02-1-076/5SL (MRC-DA-518). Dayton, Ohio, Monsanto Research Corp., Dayton Laboratory, Jan. 1976 (Final Report), 49 pages, (prepared for: Dept. of Transporation, U.S. Coast Guard, Washington, D.C.—Available Through: National Technical Information Service, Springfield, VA).

Primary Examiner—Philip Anderson
Attorney, Agent, or Firm—H. Fredrick Hamann; Clark E. DeLarvin; Henry Kolin

[57] ABSTRACT

A system for plugging holes in vessels which comprises the combination of a storage and delivery system for a foam-forming material, and a hole-plugging assembly. The hole-plugging assembly includes a flexible nonelastic bag member which is inserted in a folded position into the hole to be plugged and properly positioned with an associated locating means. Thereafter, a unitary foamable material is injected into the bag member to expand it and seal the hole. The locating means further assists in maintaining the inflated bag member in proper orientation and sealing engagement while the foam is curing.

14 Claims, 6 Drawing Figures

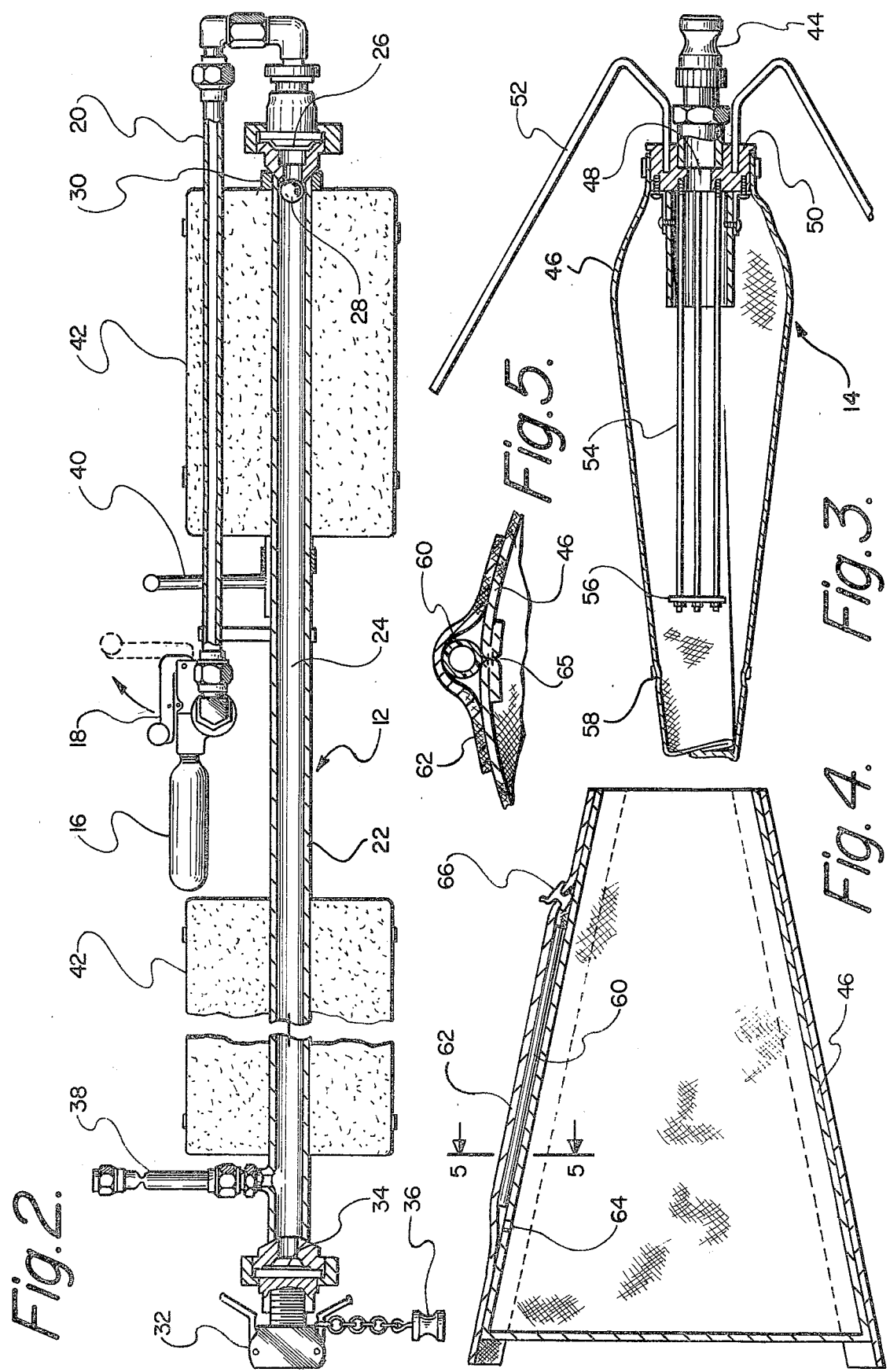

HOLE PLUGGING SYSTEM

The invention described herein was made in the course of, or under, a contract with the Department of Transportation.

BACKGROUND OF THE INVENTION

The present invention relates generally to the plugging of holes of various shapes in the walls of a container to prevent or minimize the amount of leakage of fluid therethrough. In a more particular application, the present invention deals with a means for effectively sealing leaks in a ruptured container which might contain a hazardous or dangerous chemical fluid as well as for sealing holes in the hull of a water-buoyed vessel.

In today's highly industrialized society, vast quantities of chemicals are continually being produced, stored and transported to many locations for a variety of uses and applications. Many of these chemicals are toxic to various degrees and thus capable of creating both environmental and public health hazards. Of particular danger are those chemicals which are in fluid form and which require, of course, closed containers for transport and storage. Many of these fluid chemicals are potentially polluting or even hazardous if introduced into natural waterways. The likelihood of an accidental release to the waterways is increased by the many sequences involved in the production, loading, shipping and ultimate utilization of the chemicals. Obviously, the more they are handled and transported, the greater the probability that an accidental spill might occur.

A spill of a fluid chemical may occur in a variety of ways. For example, a severe spillage occurs when the container holding the chemical fluid is violently ruptured by an explosion or impact, thereby permitting large quantities of fluid to be discharged almost instantaneously. Spills also can result when a container maintains its integrity but suffers enough damage to allow leakage of the hazardous fluid at some moderate rate. Even a moderately leaking chemical can enter the waterways, either directly, such as in the case of a barge accident or in the case of a land-transported container by the chemical entering into the water or by flowing or being washed into a drainage canal or by percolating into a ground water supply.

Counter measures which neutralize or treat hazardous chemicals may require hours or days to be initiated and involve the problem of handling large volumes of water in the event the chemicals have reached a waterway. Obviously, there exists, therefore, a need for a system which can prevent leaks of hazardous chemicals from ruptured containers by quickly and effectively plugging or stopping the leaks emanating therefrom. Advantageously, such a system should effectively function on land or under water so that an opening in a chemical container can be securely sealed against further leakage. The need for such a system also exists for water-buoyed vessels such that in the event the hull of the vessel is punctured, it can be effectively sealed before the vessel loses its buoyancy.

Though the prior art is replete with various means and methods for repairing ruptures and leaks in containers per se, none of them have been altogether satisfactory. One approach that has been proposed is the use of a pliable resilient plug which can be forced into the hole or rupture to prevent further leakage. Examples of this approach are found in U.S. Pat. Nos. 4,103,498; 3,472,285; 3,144,049; and 2,754,910. However, a disadvantage of this system is that the plug must be of the proper size to fit the particular hole to be plugged. Obviously, this would require maintaining a supply of an enormous variety of plugs to have assurance that in the event of a leak or rupture, the appropriate plug size would be available. Another disadvantage of this approach is that most of the plugs heretofore proposed would not effectively seal an irregular or jagged-shaped opening.

It has also been proposed to inject a rapid-setting foaming material in the proximity of the leak which would form a solid mass and prevent further leakage. Examples of this approach are found in U.S. Pat. Nos. 3,789,791 and 3,772,113. This system has two obvious disadvantages. One is that the leaking fluid may be a chemical which would inhibit the solidification of the foam, and the other is that if the leaking fluid is flowing at a high velocity, the foaming material may not have time to solidify before it is washed out with the leaking fluid.

Other patents which relate to various sealing and plugging techniques that are not deemed particularly relevant to the present invention are U.S. Pat. Nos. 4,010,231; 3,843,586; 2,476,601; 2,321,515; and 2,220,085.

More recently, in U.S. Pat. No. 4,058,234, there is disclosed a system for sealing and repairing leaks in punctured containers which comprises an applicator having an open cell sponge body which is inserted into the rupture. A binary or unitary fluid foam composition is injected into the sponge body to expand it and form a foam composite within the sponge body which would rapidly set and effectively seal the rupture. A disadvantage of this system is that either the sponge body and foam must be resistant to the leaking fluid or there must also be provided a resilient expandable cover which is chemically resistant to both the foam and the leaking fluid. Further, the system disclosed does not include any means to ensure proper orientation of the sponge body in the hole to be plugged or means for retaining it in position while the foam is curing.

SUMMARY OF THE INVENTION

The present invention overcomes many of the disadvantages of prior art devices for plugging holes in vessels since it provides a seal which can effectively plug a variety of sizes and shapes of holes. It further includes means for ensuring that the sealing portion is properly located in the opening to be plugged. Broadly, the present hole-plugging system comprises a combination of two assemblies; namely, a storage and delivery system and a detachable hole-plugging assembly. The storage and delivery system comprises a source of pressurized fluid such as $CO_2$ which is in flow communication with an elongated foamable material storage housing having an inlet and discharge end. Each end is sealed with a diaphram designed to burst at a predetermined pressure to permit the flow of gas into the inlet end of the housing and expel the foamable material from the outlet end. Also contained within the housing, intermediate the two diaphrams, is a body of a foamable material. The hole-plugging assembly comprises a flexible nonelastic bag member having a closed end and an open end. The open end is attached to a conduit for receiving the foamable material. The hole-plugging assembly further includes a means for locating the hole-plugging assembly at a proper depth in the hole to be plugged and retaining the assembly in position once the foamable material has been introduced and while it is curing or hardening.

In a particularly preferred embodiment of the invention, the means for locating the hole-plugging assembly comprises a plurality of rod members which extend radially outward and toward the closed end of the bag member at a predetermined distance. Advantageously, the bag member is so formed that the closed end is substantially larger than the open end when filled with the foamable material.

In accordance with another embodiment of the invention, the elongated storage housing for the foamable material has a piston located adjacent the inlet end which serves to expel the foamable material and to prevent or minimize any of the pressurizing fluid from mixing with the foamable material while it is being expelled. Upon reaching the discharge end of the housing, the piston advantageously forms a seal to prevent any substantial amount of the pressurizing fluid from entering the bag member.

BRIEF DESCRIPTION OF THE DRAWINGS

FIG. 2 is a cross section of the foam storage and delivery system 12 taken along cutting plane 2—2 of FIG. 1;

FIG. 3 is a cross section of the hole-plugging assembly 14 taken along cutting plane 3—3 of FIG. 1;

FIG. 4 is an elevation view in partial cross section of bag member 46 in an unfolded position;

FIG. 5 is a cross-sectional view of bag member 46 taken along cutting plane 5—5 of FIG. 4.

DETAILED DESCRIPTION OF THE INVENTION

Figure 1:
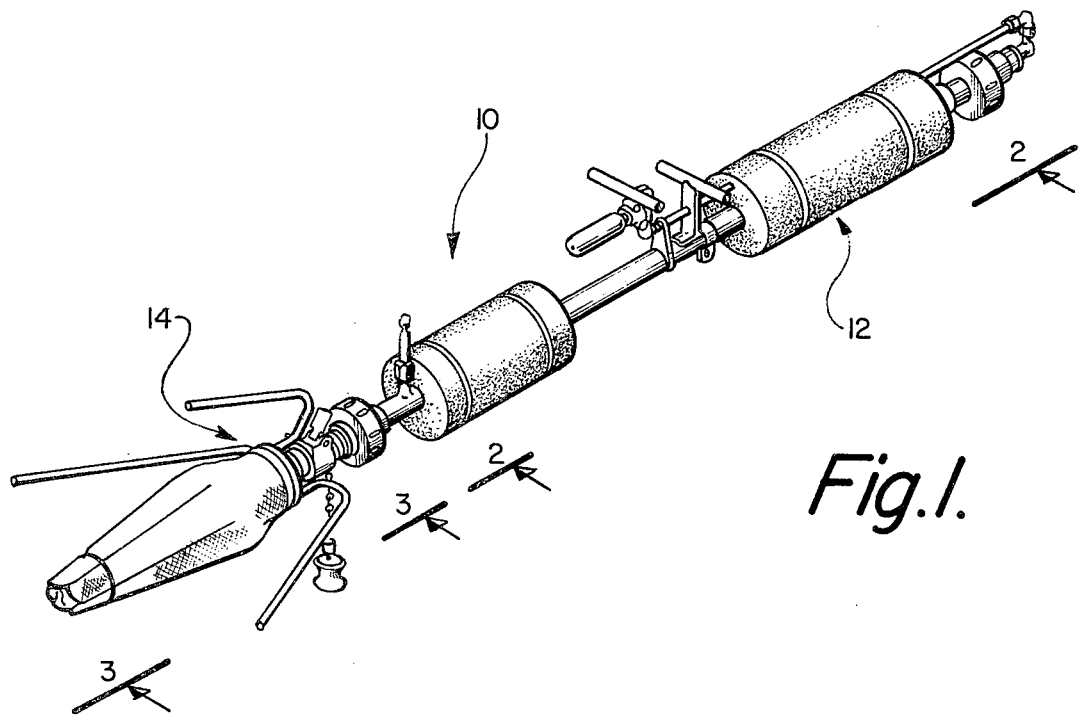
FIG. 1 is a perspective view of the system of the present invention.

Referring now to FIGS. 1-4, wherein like numbers refer to like elements, therein is depicted a particularly preferred embodiment of the hole-plugging system 10 of the present invention. Referring to FIG. 1 in particular, it is seen that the system basically comprises a foam storage and delivery assembly 12 and a hole-plugging assembly 14. Referring now to FIG. 2, foam storage and delivery assembly 12 includes a source of pressurized fluid 16, which may be, for example, compressed carbon dioxide from a standard $CO_2$ gas cartridge which is connected to the manually operable actuator means 18, which is, in turn, connected to and in fluid communication with a conduit 20. Conduit 20 terminates at one end of an elongated storage housing 22. Housing 22 has an interior storage zone 24 which is isolated from flow communication with conduit 20 by a diaphragm 26. Contained within zone 24 adjacent diaphram 26 is a piston means 28. In the particular embodiment depicted, piston means 28 comprises a magnetic spherical member which is retained in position by a permanent magnet 30. The outer end of housing 22 terminates in an attachment means for connection to hole-plugging assembly 14. In the preferred embodiment, the attachment means comprises a quick disconnect assembly 32. Disconnect assembly 32 is sealed from fluid communication with zone 24 by another diaphragm member 34. Advantageously, quick disconnect assembly 32 is also provided with a plug 36 to minimize the possibility of any damage to diaphram 34 when assembly 12 is being stored. Housing 22 is provided with a fill line 38 for the introduction of a foamable material into zone 24. After the appropriate amount of foamable material has been introduced through fill line 38, it is closed by any suitable means such as a cap, plug or the like; though in the preferred embodiment depicted, it is crimped and brazed to ensure a leak-tight seal.

When the system of the present invention is intended for use under water, it advantageously is further provided with a palm rest 40 to assist the operator in manipulating actuation device 18. It also has been found advantageous to provide assembly 12 with spaced-apart flotation means 42, such that the assembled system will have a substantially neutral buoyancy to facilitate manipulation of the system under water. Further, flotation means 42 advantageously will provide sufficient buoyancy such that after use of the system and detachment of assembly 12 from hole-plugging assembly 14, assembly 12 will then float to the surface of the water for recovery.

Referring now to FIG. 3, it is seen that hole-plugging assembly 14 includes an attachment means 44 for engagement with quick disconnect assembly 32 of assembly 12. Attachment means 44 also provides fluid communication with a bag assembly 46 via passageway 48 through body member 50. Bag 46 has an open end which is attached to and in sealing engagement with body member 50 by any suitable means. Also connected to body member 50 is a locating means which comprises a plurality, preferably three, equally spaced locating members 52 which project a substantially equal distance toward the closed end of bag 46.

In the particularly preferred embodiment depicted, there further is provided a means for dispersing foam entering passageway 48 in a radial direction out into bag 46. As shown, this comprises a plurality of rods 54 connected at one end to body member 50 and having affixed to their other ends a flat plate or baffle member 56, which is in axial alignment with passageway 48 through body member 50 and at right angles thereto, such that fluid entering through passageway 48 impinges upon flat plate 56 and is dispersed outwardly into bag 46. As shown in FIG. 3, bag 46 is in the folded position and for storage is maintained in the folded position through use of a retaining member such as a tie, cord or rubber band 58. FIG. 4 shows bag member 46 in an unfolded position. In the particular embodiment depicted, bag 46 is provided with a means for the escape of trapped gas from within bag 46. Referring also to FIG. 5, it is seen that the means for escape of trapped gas comprises a tube member 60 which is retained in place by a cover layer of tape 62 or a sewn layer of the same material from which bag 46 is made. The pocket containing tube 60 is in fluid communication with the interior bag 46 via an opening 64 or a plurality of such openings spaced along tube 60. Alternatively, as depicted in FIG. 5, gas can escape through a seam 65 provided along the length of tube 60. The other end of tube 60 is sealed from communication with the atmosphere by a pressure-displaceable plug 66, which could be a simple rubber stopper, a non-hardening putty, a check valve or the like.

Figure 6:
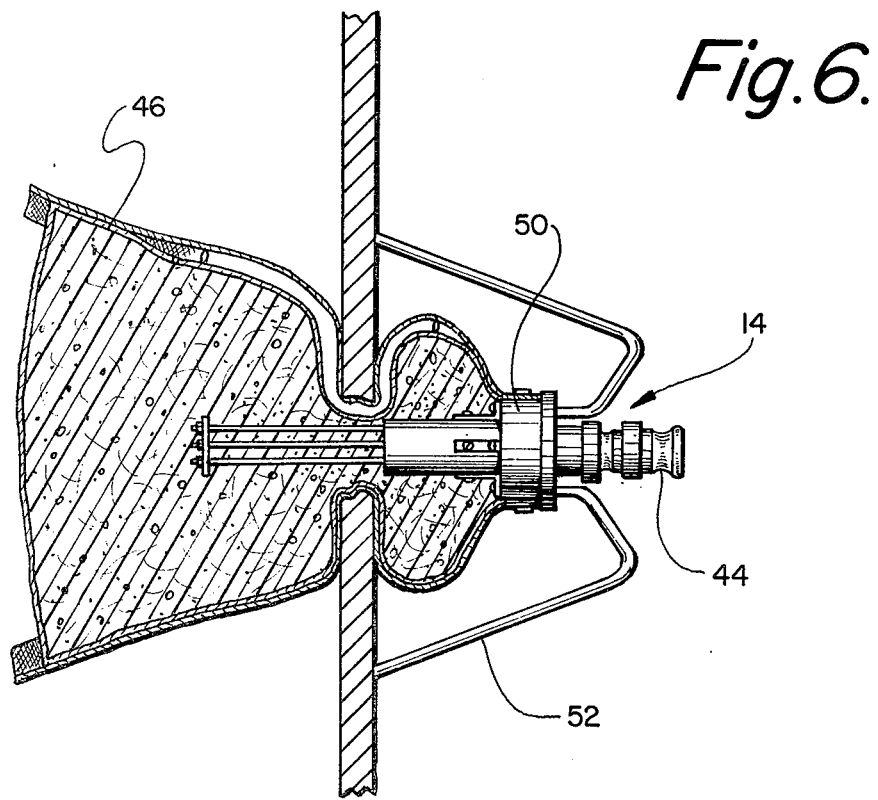
FIG. 6 is a partial cross-sectional view of hole-plugging assembly 14 fully expanded after having been inserted into a hole.

In the operation of the present invention, the system is assembled as depicted in FIG. 1, and hole-plugging assembly 14 is inserted into a hole to be plugged. Actuation means 18 is operated to cause pressurized gas from source 16 to flow through conduit 20. When the pressure in conduit 20 has built up to a sufficient level, diaphram 26 will rupture, and gas pressure will move piston means 28 through zone 24 of housing 22. The movement of piston means 28 will, in turn, cause the foamable material to rupture diaphram 34, causing the foamable material in zone 24 to be discharged to hole-plugging assembly 14 via passageway 48 where it impinges on plate 56 and is dispersed radially inside bag 46 causing the bag to expand and try to resume its unfolded shape. Thus, as shown in FIG. 6, bag 46, now filled with foam, is expanded to seal the hole. Further, by virtue of the substantially conical shape of bag 46 when it is inflated, it is seen that the majority of the foamable material is away from the locating members 52 such that the expanded material in bag 46 and locating members 52 cooperate to retain hole-plugging assembly 14 in place while the foamable material is hardening. Further, when piston means 28 reaches the discharge end of housing 22, it forms a seal at the discharge end to prevent any substantial amount of pressurizing fluid from entering bag 46 where it could cause voids in the foamable material.

The selection of materials for use in constructing the present system is not particularly critical and is well within the skill of one versed in the art to which the invention applies. The gas source preferred is carbon dioxide because of its low cost and availability. However, various other gases such as compressed air, nitrogen, helium, etc., also could be used. Other sources of a pressurized fluid also will be apparent equivalents.

The precise size and shape of the bag member 46 also is to some extent a matter of design choice, provided that the closed end of the bag be larger than the open end and that it has a volume sufficient to accommodate the foamable material after it has been injected into the bag and expanded. Generally, the closed end of the bag will be at least twice and preferably at least four times as large as the closed end. The selected shape will be a function of the size of holes anticipated and the wall thickness of the vessel in which the plug assembly is to be inserted. It also is a significant feature of the invention that the bag member be formed from a substantially nonelastic material. As used herein, the term "substantially nonelastic" refers to a material which will not stretch more than about 20% of its unloaded length and preferably less than 10%.

Generally, the bag will be formed from woven fibers which may be either natural fibers such as cotton, wool, and the like, or synthetic fibers. The selection of material will depend, of course, upon the intended application, i.e., the environment to which the bag will be exposed.

When the bag is or may be exposed to a harsh or corrosive chemical, it may be advantageous to coat the material or impregnate it with a layer of a substantially chemically inert polymer. Examples of suitable materials include nitrile rubber, polyvinyl chloride, polyfluorinated ethylenes, chlorobutadiene and chlorosulfonated polyethylene, among others. The selection of a suitable coating material will depend, of course, upon the anticipated environment to which the material will be exposed.

The particular foamable material selected may vary depending upon the application of the system. A particularly preferred material is polystyrene in a mixture of methyl chloride and bromotrifluoromethane. For a more complete description of this material and its formulations see Report AD-A021-076/5SL (MRC-DA-518), "Feasibility of Use of Plastic Foams for Small Vessel Flotation Devices" by S. M. Sun et al., Monsanto Corporation (January 1976), which is incorporated herein by reference. However, any other fast setting, unitary foamable material which does not require mixing of two or more components to initiate foaming and curing, and which will solidify when injected into the bag to form an expanded cellular structure can be used. Preferably, the selected material will cure or solidify in less than 30 seconds. The hereinbefore mentioned preferred material will set or cure in less than about 15 seconds.

While the system of the present invention has been described with respect to the storage and delivery system 12 being used in conjunction with hole-plugging assembly 14, it will also be appreciated that each could be used alone. Specifically, the hole-plugging assembly 14 can be used with another foam delivery system and vice versa. Further, while a unitary foamable material is preferred, a two-compartment foamable material also could be used. The two or multicomponent systems, however, require some means to control mixing of the components as they are injected into the bag and are therefore less desirable.

A series of tests were conducted utilizing the hole-plugging system substantially as described in the specification and depicted in the drawings. The hole-plugging assembly was designed for a nominal 4-inch diameter opening. The tests were conducted both above and below water, and it was found that the system of the present invention could effectively seal both regular and irregular-shaped holes having diameters from 2.5 up to 8 inches. Further, it also was possible to seal an elongated opening having a length substantially greater than eight inches by utilizing a plurality of hole-plugging assemblies, thus demonstrating the efficacy of the present invention.

While certain specific arrangements and details have been set forth in the specification and drawings to illustrate what is now considered a preferred embodiment of the invention, it will be clear to those skilled in the art that many of the specific details may be varied without departing from the spirit of the invention. Accordingly, the scope of the invention should not be limited by the foregoing specific illustrations but only by the following claims.

What is claimed is:

1. A hole-plugging system comprising in combination a foam storage and delivery assembly and a hole-plugging assembly:

the storage and delivery assembly comprising:
   a source of a pressurized fluid,
   an elongated storage housing having an inlet end and a discharge end, each end being sealed with a diaphragm,
   means for delivering pressurized fluid from said source to said inlet end of said housing to rupture the diaphragms,
   a body of foamable material contained in said housing and means for connecting said storage and delivery assembly in fluid communication with the hole-plugging assembly;

the hole-plugging assembly comprising:
   a body member having a passageway therethrough for receiving foamable material from said discharge end of said storage housing and
   a flexible, nonelastic bag member having a closed end and an open end, said open end being affixed to said body member for receiving foamable material therefrom, said closed end being substantially larger than said open end; and locating means for locating said hole-plugging assembly at a proper depth in a hole to be plugged and retaining the assembly in position when foamable material is introduced into the bag member.

2. The system of claim 1 wherein said locating means comprises a plurality of rod members attached to said body member and extending radially outward and toward the closed end of the bag member.

3. The system of claim 1 further including piston means located in the storage housing adjacent the inlet end.

4. The system of claim 3 wherein the piston means is retained in place during storage by a magnet affixed to the inlet end of said storage housing.

5. The system of claim 1 wherein said bag member comprises a woven fiber gas-permeable fabric.

6. The system of claim 5 wherein said fabric has an outer covering of a substantially chemically inert polymer.

7. The system of claim 6 wherein said bag member further includes a means for the escape of gas introduced into said bag.

8. A hole-plugging system comprising a body member having a passageway therethrough for receiving a foamable material, a flexible nonelastic bag member having a closed end and an open end, said open end being affixed to said body member for receiving foamable material therefrom, said closed end being substantially larger than said open end, locating means for locating said bag member at a proper depth in a hole to be plugged and retaining the assembly in position when foamable material is introduced into the bag member, and means for delivering foamable material to said body member.

9. The system of claim 8 wherein said locating means comprises a plurality of rod members attached to said body member and extending radially outward and toward the closed end of the bag member.

10. The system of claim 8 wherein said bag member comprises a woven fiber gas-permeable fabric.

11. The system of claim 8 wherein said fabric has an outer covering of a substantially chemically inert polymer.

12. The system of claim 11 wherein said bag member further includes means for the escape of gas introduced into said bag.

13. A hole-plugging system comprising:
a source of a pressurized fluid;
an elongated storage housing having an inlet end and a discharge end, each of said ends being sealed with a diaphragm;
means for delivering pressurized fluid from said source to said inlet end of said housing to rupture the diaphragms;
a body of foamable material contained in said housing; and
means for delivering said foamable material to an inflatable hole-plugging assembly.

14. The system of claim 13 further including a piston means located in the storage housing adjacent the inlet end.

* * * * *